United States Patent [19]

Wiley

[11] Patent Number: 4,621,267

[45] Date of Patent: Nov. 4, 1986

[54] BEARING INTERSECTION DEGHOSTING BY ALTITUDE COMPARISON SYSTEM AND METHODS

[75] Inventor: Edward R. Wiley, Mercer Island, Wash.

[73] Assignee: The Boeing Company, Seattle, Wash.

[21] Appl. No.: 655,706

[22] Filed: Sep. 28, 1984

[51] Int. Cl.$^4$ .............................. G01S 3/02; G01S 5/02
[52] U.S. Cl. ................................. 342/462; 342/430; 342/450; 342/465
[58] Field of Search ............... 343/450, 453, 458, 462, 343/465, 11 VB, 444, 387, 428, 430, 463, 464; 364/449, 458

[56] References Cited

U.S. PATENT DOCUMENTS

| | | |
|---|---|---|
| 2,415,094 | 1/1938 | Hansen et al. . |
| 2,646,563 | 9/1946 | Stabler . |
| 3,078,459 | 2/1963 | Vadus et al. . |
| 3,154,783 | 10/1964 | Kerdock . |
| 3,182,328 | 2/1961 | Hings . |
| 3,184,739 | 5/1965 | Franklin et al. . |
| 3,210,762 | 11/1961 | Brabant . |
| 3,242,487 | 12/1963 | Hammack . |
| 3,242,491 | 3/1966 | Winter . |
| 3,267,469 | 8/1966 | Vadus . |
| 3,328,565 | 6/1967 | Prichodjko . |
| 3,337,869 | 8/1967 | Bernstein et al. . |
| 3,398,268 | 8/1968 | Prichodjko et al. . |
| 3,445,847 | 5/1969 | Hammack . |
| 3,696,418 | 10/1972 | Litchford . |
| 4,268,167 | 5/1981 | Alderman . |
| 4,339,755 | 7/1982 | Wright . |

Primary Examiner—Theodore M. Blum
Assistant Examiner—Gregory C. Issing
Attorney, Agent, or Firm—Finnegan, Henderson, Farabow, Garrett & Dunner

[57] ABSTRACT

A passive system and related methods for detecting the location of a plurality of N targets by using two X-beam antenna systems and by (i) measuring the time delay between receipt of signals in the two planes of each X-beam which are received directly from the target and by (ii) measuring the time delay between the receipt of signals in the two planes of each X-beam which signals are emitted by the target but reflected from a remote surface. By known these two time delays for each antenna system, the heights of the antenna systems, the fixed angle between the two planes of the X-beam for each system, and the rate of rotation of the X-beam for each system, a direct calculation is established to determine the altitude of each target as viewed from each of the two antenna systems. Bearing or azimuth angles are determined for each target at each antenna system, and the actual N target locations of the $N^2$ possible locations are determined by locating the intersection of lines defined by azimuth angles for which the associated target altitudes for both the antenna systems are equal.

16 Claims, 5 Drawing Figures

BEARING INTERSECTION DEGHOSTING BY ALTITUDE COMPARISON SYSTEM AND METHODS

BACKGROUND OF THE INVENTION

I. Field of the Invention

The present invention relates to a passive system and corresponding methods for efficiently and economically determining which of a plurality of possible target locations are, in fact, real target locations.

II. Description of the Prior Art

Passive surveillance systems are known which can identify the bearing or azimuth of a target by simply rotating a receiving antenna and determining the azimuth angle of that antenna upon receipt of a signal transmitted by the target. The bearing or "strobe" of each target may be displayed and these bearings or strobes can be transmitted or cross-told to a cooperating system. With the bearings or strobes from a cooperating system the resultant display may form a crisscross pattern and the targets under consideration may actually be positioned at any one of the intersections.

The locations of the intersections are accurately defined by a known triangulation method, using the bearing or "strobe" angle measured by each surveillance system and using the known distance between the surveillance systems.

Figure 1:
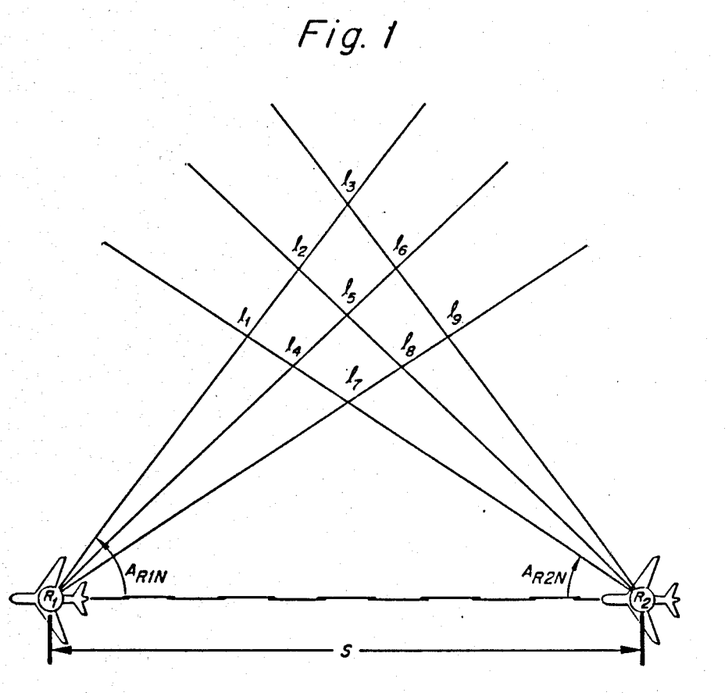
FIG. 1 is a vector diagram which is used to explain a multiple target crisscross pattern of potential target locations.

The number of intersections of such a display is the square of the targets detected. Accordingly, if as shown in FIG. 1 there were a first receiver R1 which detects N (for example 3) targets, each at an azimuth bearing $A_{R1N}$, and there were provided a distance S from the first receiver R1 a second receiver R2 which was in range of the same three targets and received signals from each of those targets at a corresponding azimuth angle $A_{R2N}$, the resultant cross-pattern would produce nine possible target locations $1_1$–$1_9$.

At present, no quick way exists to determine which of the possible target locations is an actual location, although software programs to track target intersections, to analyze their movements, and to apply logic to accomplish the deghosting or actual target location function does exist. Such systems are moderately successful in that they may be able to eliminate a certain percentage of the possible target locations as being actual target locations. However, such systems have an inherent limitation because of the requirement that the depression angle of the antenna at the time of receipt of a signal be physically measured. Due to limited vertical aperture, weight, and aerodynamic considerations associated with airborne systems physical, measurement of such depression angles cannot be accomplished with the necessary accuracy so as to confidently determine those possible target locations which are, in fact, real.

Accordingly, it is an object of the subject invention to provide a passive surveillance system which can efficiently and effectively identify which of a plurality of possible target locations is, in fact, a real target location.

Additional objects and advantages of the invention will be set forth in the description which follows and in part will be obvious from the description or may be learned by practice of the invention. The objects and advantages of the invention may be realized and obtained by means of the instrumentalities and combinations particularly pointed out in the appended claims.

SUMMARY OF THE INVENTION

To achieve the foregoing objects and in accordance with the purposes of the invention as embodied and broadly described herein, a system and related methods are provided for detecting the location of a plurality of targets. This system comprises: (a) a first antenna system having first and second planes of receipt which are inclined a fixed angle ($\theta_1$) from one another, the first antenna system being located along the line of intersection of the first and second planes, the first antenna system including means for sweeping the line of intersection at a known rate of sweep ($\tau_1$), and means for measuring the instantaneous azimuth angle ($A_{R1}$) of the line of intersection; (b) a second antenna system spaced apart from the first antenna system a known distance (S), the second antenna system having third and fourth planes of receipt which are inclined a fixed angle ($\theta_2$) from one another, the second antenna system being located along the line of intersection of the third and fourth planes, the second antenna system including means for sweeping the line of intersection at a known rate of sweep ($\tau_2$), and means for measuring the instantaneous azimuth angle ($A_{R2}$) of the line of intersection; (c) means for determining the azimuth angles $A_{R1N}$ and $A_{R2N}$ for each of N targets which are within the range of the first and second antenna systems; (d) means for measuring the delay $T_{1R1N}$ between receipt by the first antenna system of signals in the first and then in the second planes which are emitted from each of the N targets and received directly by the first antenna system; (e) means for measuring the delay $T_{1R2N}$ between receipt by the second antenna system of signals in the third and then in the fourth planes which are emitted from each of the N targets and received directly by the second antenna system; (f) means for measuring the delay $T_{2R1N}$ between receipt by the first antenna system of signals in the first and then in the second planes which are emitted from the N targets and received by the first antenna system after being reflected from a remote surface; (g) means for measuring the delay $T_{2R2N}$ between receipt by the second antenna system of signals in the third and then in the fourth planes which are emitted from the N targets and received by the second antenna system after being reflected from a remote surface; (h) means for measuring the heights $R_{1H}$ and $R_{2H}$ of the first and second antenna systems; and (i) means for calculating, for each of N azimuth angles $A_{R1N}$, the elevation ($H_{1N}$) of the target associated with that angle in response to $\theta_1$, $\tau_1$, $T_{1R1N}$, $T_{2R1N}$, and $R_{1H}$; means for calculating, for each of N azimuth angles $A_{R2N}$, the elevation ($H_{2N}$) of the target associated with that angle in response to $\theta_2$, $\tau_2$, $T_{1R2N}$, $T_{2R2N}$, and $R_{2H}$; and means for selecting N of the $N^2$ possible locations of the targets as real target locations by determining the location of the intersection of lines defined by the azimuth angles $A_{R1N}$ and $A_{R2N}$ for which the associated elevations $H_{1N}$ and $H_{2N}$ are equal. Preferably, the means for calculating determines each target elevation $H_{1N}$ using the relationship:

$$H_{1N} = R_{1H} - R_{SR1N} \cdot \sin(\alpha_{DR1N})$$

$$\text{where: } R_{SR1N} = \frac{2R_{1H} \cdot \cos(\alpha_{GR1N})}{\sin(\alpha_{DR1N} + \alpha_{GR1N})};$$

$$\alpha_{DR1N} = \tan^{-1}[\sin(T_{1R1N} \cdot \tau_1)/\tan(\theta_1)]; \text{ and}$$

-continued $$\alpha_{GR1N} = \tan^{-1} [\sin (T_{2R1N} \cdot \tau_1)/\tan (\theta_1)].$$

It is also preferable that the means for calculating determines each target elevation $H_{2N}$ using the relationship:

$$H_{2N} = R_{2H} - R_{SR2N} \cdot \sin (\alpha_{DR2N})$$

$$\text{where: } R_{SR2N} = \frac{2R_{2H} \cdot \cos (\alpha_{GR2N})}{\sin (\alpha_{DR2N} + \alpha_{GR2N})};$$

$$\alpha_{DR2N} = \tan^{-1} [\sin (T_{1R2N} \cdot \tau_2)/\tan (\theta_2)]; \text{ and}$$

$$\alpha_{GR2N} = \tan^{-1} [\sin (T_{2R2N} \cdot \tau_2)/\tan (\theta_2)].$$

BRIEF DESCRIPTION OF THE DRAWINGS

The accompanying drawings, which are incorporated in and constitute a part of the specification, illustrate a preferred embodiment of the invention and, together with the general description of the invention given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

The system and methods of the subject invention are based on the idea of measuring at each of at least two receivers the depression angle$\alpha_D$ of a signal which arrives directly at that receiver from each target and also measuring the depression angle $\alpha_G$ from each target as reflected from a remote surface such as the ground. By using these two angles, a direct non-ambiguous determination can be made of both the range and altitude of each target as viewed from each of the receivers. The altitudes calculated can then be compared for each azimuth angle at which a target was detected at the receivers. When an azimuth angle at one receiver has the same calculated altitude as the azimuth at a second receiver, the point of interception of lines defined by these two azimuth angles represents a real target location. When this process has been completed for each of N azimuth angles and for two receivers, the actual target location of the $N^2$ possible location represented by crossing lines defined by these azimuth angles can be identified quickly and efficiently.

Specifically, the system of the subject invention contemplate the detection of the location of each of a plurality of targets by employing a first antenna system having first and second planes of receipt which planes are inclined a fixed angle $\theta_1$ from each other, this first antenna system being located along the line of interception of the first and second planes. This first antenna system includes means for sweeping the lines of intersection of the first and second planes at a known rate of sweep $\tau_1$ and means for measuring the instantaneous azimuth angle $A_{R1}$ of the line of intersection. The instantaneous azimuth angle for any given target N is hereinafter referred to as $A_{R1N}$.

A similar second antenna system is spaced apart from the first antenna system a known distance S. This second antenna system includes third and fourth planes of receipt which are inclined a fixed angle $\theta_2$ from one another. The second antenna system is located along the line of intersection of the third and fourth planes with the second antenna system including means for sweeping the line of intersection of the third and fourth planes at a known rate of sweep $\tau_2$. The second antenna system further includes the means for measuring the instantaneous azimuth angle $A_{R2}$ of the line of intersection. Hereinafter, the instantaneous azimuth angle of the second antenna system for any given target N is referred to as $A_{R2N}$.

Accordingly, the first and second antenna systems of the subject invention are antenna systems generically known as "X" or "V" beam antenna systems.

Figure 2:
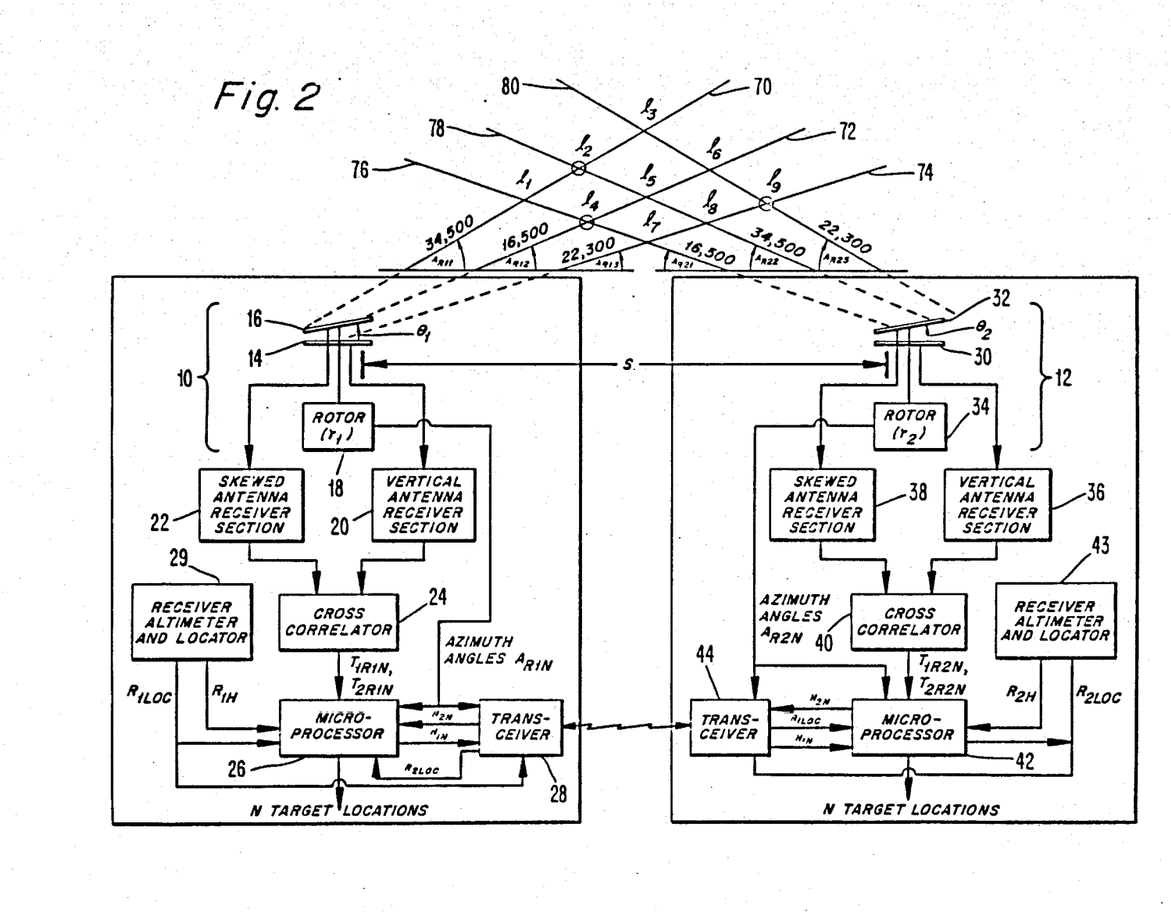
FIG. 2 is a block diagram of a system incorporating the teachings of the subject invention.

In FIG. 2 there is illustrated a block diagram of a system employing the teachings of the subject invention. Depicted in FIG. 2 is a first antenna system 10 which may be associated with receiver R1 of FIG. 1. There is also illustrated in FIG. 2 a second antenna system 12 which may be associated with receiver R2 of FIG. 1. Antenna system 10 includes antennas 14 and 16, and rotor 18. Associated with antenna system 10 is a vertical receiver section 20, a skewed antenna receiver section 22, a cross correlator 24, a microprocessor 26, a transceiver 28, and a receiver altimeter and locator 29.

Antenna system 12 includes antennas 30 and 32 and rotor 34. Associated with antenna system 12 is a vertical antenna receiver section 36, skewed antenna section 38, cross correlator 40, microprocessor 42, transceiver 44, and a receiver altimeter and locato 43.

Antenna system 10 and components related thereto may, for example, be mounted to constitute an airborne receiver such as receiver R1 of FIG. 1. Antenna system 12 and related components may be mounted in a second aircraft to constitute receiver R2 of FIG. 1 with antenna systems 10 and 12 separated from one another a distance S. Distance S may be determined by any standard method by simply comparing the location of receiver R1, namely $R_{1LOC}$, with the location of receiver R2, namely $R_{2LOC}$. $R_{1LOC}$ and $R_{2LOC}$ may be exchanged using transceivers 28 and/or 44.

Antennas 14, 16, 30 and 32 each produce a receiving fan beam with is planar in the sense that the beam is very narrow in one direction and very wide in the other. Such antennas are known in the art as "azimuth only" antennas. Antennas 14 and 30 are illustrated in FIG. 2 as being physically oriented horizontally which produces a corresponding vertical planar beam. Although a vertical orientation is preferred, it is not critical. Antenna 16 is illustrated in FIG. 2 as being set a fixed angle $\theta_1$ in comparison to antenna 14 and, therefore, produces a planar fan beam which is offset at angle $\theta_1$ from the planar fan beam produced by antenna 14. Preferably, angle $\theta_1$ is from 5 to 30 degrees.

In a similar manner, antenna 30 is illustrated in FIG. 2 as being physically oriented horizontally which produces another vertical planar beam. Antenna 32 is illustrated as being set at a fixed angle $\theta_2$ in comparison to antenna 30 and, therefore, produces a planar fan beam which is offset an angle $\theta_2$ from the planar fan beam produced by antenna 30. Angle $\theta_2$ is also preferably from 5 to 30 degrees.

Figures 3, 4:
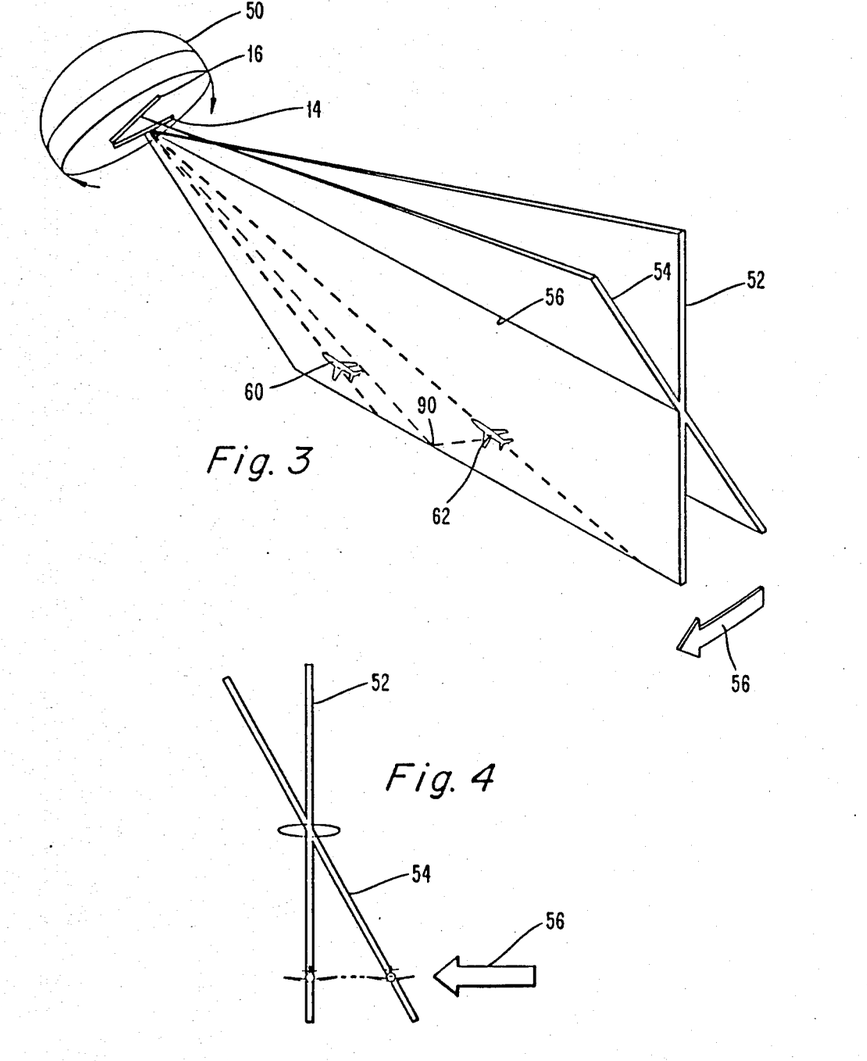
FIG. 3 is a perspective view of an X-beam which is employed in connection with the teachings of the present invention.
FIG. 4 is an end view of the X-beam of FIG. 3.

Antennas 14 and 16 are preferably mounted in an airborne rotodome 50 as shown in FIG. 3, with antenna 14 defining a vertical plane 52 and antenna 16 defining a skewed plane 54. Since antennas 30 and 32 are mounted similar to antennas 14 and 16, the discussion which herein follows will be only with respect to antennas 14 and 16, with the understanding that a similar discussion is equally applicable to antennas 30 and 32.

Planes 52 and 54 intersect one another along a line of intersection 56. Antennas 14 and 16 are located along line of intersection 56. As may be seen from FIG. 4 which is an end view of planes 52 and 54, planes 52 and 54 form an X. Although the orientation of line of intersection 56 is optional, it is preferable that line of intersection 56 be oriented parallel to a line which is tangent to the surface of the earth directly below antennas 14 and 16 or that line 56 be oriented so as to intercept the horizon as seen from antennas 14 and 16. Moreover, as used herein, the term "depression angle" is to be considered synonomous with "elevation angle," since the only difference between the two is that for the former a target is below the line of intersection of the antenna systems and for the latter the target is above that line.

Rotor 18 of FIG. 2 is physically connected to antennas 14 and 16 in the same manner that rotor 34 is physically connected to antennas 30 and 32. Rotor 18 is capable of imparting a rotation to line of intersection 56 and, therefore, planes 52 and 54 at a rate of sweep $\gamma_1$. In a similar manner, rotor 34 is capable of imparting rotation to a corresponding line of intersection and corresponding planes of antennas 30 and 32 at a rate of sweep $\tau_2$. Rates of sweep $\tau_1$ and $\tau_2$ may, for example, be equal to 36 degrees per second.

As shown in FIGS. 3 and 4, rotor 18 may, for example, impart a clockwise directional rotation to planes 52 and 54 as indicated by arrow 56. Accordingly, with such rotation, targets 60 and 62 located below line of intersection 56 would each first fall within vertical plane 52 and thereafter each fall within skewed plane 54.

As a target falls within the range of vertical plane 52 simultaneous with detection of that target, the instantaneous azimuth angle $A_{R1N}$ as determined by the position of rotor 18 is identified. Angles $A_{R1N}$ may then be used to display bearing lines 70, 72 and 74 as illustrated in FIG. 2. Similar azimuth lines 76, 78 and 80 may be displayed as the result of determining the corresponding azimuth angles $A_{R2N}$ as the targets are intercepted by the vertical plane developed by antenna 30 of antenna system 12. The distance S between antenna systems 10 and 12 is known using conventional techniques and, therefore, each potential target location can be calculated also using known techniques.

Assuming, for example, there are three targets located at $1_2$, $1_4$ and $1_9$, there would necessarily be $3^2$ or 9 potential target locations $1_1$ through $1_9$. Without additional information, it would be impossible to determine which of locations $1_1$ through $1_9$ are, in fact, the three actual target locations. In order to determine which of these locations is, in fact, correct the subject invention contemplates determining the altitude of each target location as seen from each of the two antenna systems 10 and 12. If an accurate altitude measurement system is employed, the altitude for the target along azimuth line 70 will correspond with an altitude measurement along one of azimuth lines 72, 78 and 80, and the intersection of these two lines will indicate an actual target location. For example, assuming that a target at $1_2$ has an altitude of 4,500 feet, then the altitude calculation for azimuth line 70 using information determined by antenna sytem 10 should be 4,500 feet and the altitude calculation determined for azimuth line 78 using information derived by antenna system 12 should also be 4,500 feet, indicating an actual target location at $1_2$, namely the intersection of azimuth lines 70 and 78.

A key to such a system is accurate and rapid altitude measurement. The method of altitude measurement employed in connection with the subject invention is generically disclosed in co-pending U.S. patent application Ser. No. 655,705, filed Sept. 28, 1984 by the Edward R. Wiley, entitled "Two Angle Range and Altitude Measurement System and Methods," and assigned to the same assignee as the subject application. The contents of this co-pending Wiley application is herein expressly incorporated by reference.

As noted in the co-pending Wiley application, target height may be determined as a function of the height of the antenna system minus the slant range of the antenna system to the target times the sine of the depression angle from that antenna system to the target. Specifically, for any given target N, target heights $H_{1N}$ calculated from a first receiver employing a first antenna system may be determined using the following relationships:

$$H_{1N} = R_{1H} - R_{SR1N} \cdot \sin(\alpha_{DR1N}) \quad (1)$$

$$\text{where: } R_{SR1N} = \frac{2R_{1H} \cdot \cos(\alpha_{GR1N})}{\sin(\alpha_{DR1N} + \alpha_{GR1N})} ; \quad (2)$$

$$\alpha_{DR1N} = \tan^{-1}[\sin(T_{1R1N} \cdot \tau_1)/\tan(\theta_1)]; \text{ and} \quad (3)$$

$$\alpha_{GR1N} = \tan^{-1}[\sin(T_{2R1N} \cdot \tau_1)/\tan(\theta_1)]. \quad (4)$$

In the above equation (1), $R_{SR1N}$ refers to the slant target distance $R_S$ for the first receiver, namely receiver R1, for a particular target, namely target N. The term $\alpha_{DR1N}$ in equation (1) refers to the direct target depression (or elevation) angle $\alpha_D$ for receiver R1 for a particular target N. The term $\alpha_{GR1N}$ in equation (2) is the ground bounce depression (or elevation) angle $\alpha_G$ for receiver R1 for target N. The time period $T_{1R1N}$ in equation ; (3) is the time delay $T_1$ between receipt by a first antenna system of receiver R1 of signals in the first and then the second planes formed by that antenna system which signals are emitted from each of the N targets and received directly by the R1 antenna system. The term $T_{2R1N}$ in equation (4) is the time delay $T_2$ between receipt by an antenna system of receiver R1 of signals in the first plane and then in the second plane which signals are emitted from the N targets and are received by the antenna system of receiver R1 only after being reflected from a remote surface. As mentioned above, $\theta_1$ is the fixed angle between the planes formed by the first antenna system, for example antenna system 10 of FIG. 2, and $R_{1H}$ is merely the height of that first antenna system and may be determined by any standard altimeter represented by receiver altimeter 29 of FIG. 2.

The time periods $T_{1R1N}$ and $T_{2R1N}$ are derived from the output of cross correlator 24 in the same manner that corresponding times $T_1$ and $T_2$ were derived from the cross correlator in the Wiley application referred to above. By way of further explanation, for a particular target N (for example target 62 of FIG. 3), plane 52 will first intersect target 62 and cross correlator 24 has the capacity, as should be apparent to one skilled in the art, to determine the time of arrival $(T_A)$ of a signal received directly from target 62 upon coincidence of target 62 with plane 52. In a similar manner, cross correlator 52 has the capacity to determine the time of arrival $(T_B)$ of a signal from target 62 which passes through a ground bounce point 90 (shown in FIG. 3) upon coincidence of ground bounce point 90 and plane 52; to determine the time of arrival $(T_C)$ of a signal directly from target 62 upon coincidence of target 62 and plane 54; and to determine the time of arrival $(T_D)$ of a signal from target 62 upon coincidence of ground bounce point 90 and plane 54. The difference between $T_A$ and $T_C$ is generically referred to as time delay $T_1$ and, for a particular receiver R1 and a particular target N, is referred to as $T_1R1N$. The difference between $T_B$ and $T_D$ for any particular target N is referred to generically as time delay $T_2$ and, for a particular receiver R1 and a particular target N, is referred to as $T_2R1N$.

In a similar manner, $T_1$ and $T_2$ may be determined for a second receiver R2 which could, for example, be associated with antenna system 12 of FIG. 2. In such a case, there would be derived a time delay $T_1R2N$ and a time delay $T_2R2N$ which provides the $T_1$ and $T_2$ time delays for antenna system 12. With regard to FIG. 2, these time delays $T_1R2N$ and $T_2R2N$ are developed by cross correlator 40 and delivered to microprocessor 42 in the same manner that $T_1R1N$ and $T_2R1N$ are developed by cross correlator 24 and delivered to microprocessor 26. Microprocessor 42 also receives azimuth angles $A_{R2N}$ from rotor 34 and antenna system height $R_{2H}$ from receiver altimeter 43. In a similar manner, microprocessor 26 receives azimuth angles $A_{R1N}$ from rotor 18 and antenna system height $R_{1H}$ from receiver altimeter 29.

Microprocessor 26, accordingly, has sufficient input data, namely $\theta_1$, $\tau_1 1$, $T_1R1N$, $T_2R1N$, and $R_{1H}$ to calculate target height $H_{1N}$ for each azimuth angle $A_{R1N}$, using the relationships set forth above in equations (1) and (2), (3), and (4).

In a similar manner, the height for each target along azimuth lines detected by antenna system 12 may be calculated, with each such height $H_{2N}$ determined as follows:

$$H_{2N} = R_{2H} - R_{SR2N} \cdot \sin(\alpha_{DR2N}) \quad (5)$$

$$\text{where: } R_{SR2N} = \frac{2R_{2H} \cdot \cos(\alpha_{GR2N})}{\sin(\alpha_{DR2N} + \alpha_{GR2N})}; \quad (6)$$

$$\alpha_{DR2N} = \tan^{-1}[\sin(T_1R2N \cdot \tau_2)/\tan(\theta_2)]; \text{ and} \quad (7)$$

$$\alpha_{GR2N} = \tan^{-1}[\sin(T_2R2N \cdot \tau_2)/\tan(\theta_2)]. \quad (8)$$

Equations (5), (6), (7) and (8) correspond respectively to equations (1), (2), (3) and (4) given above. Accordingly, given $\theta_2$, $\tau_2$, $T_1R2N$, $T_1R2N$ and $R_{2H}$, microprocessor 42 of FIG. 2 has the capacity to determine the altitude of $H_{2N}$ for each target within the range of antenna system 12, for each azimuth angle $A_{R2N}$ at which a target is detected.

Transceiver 28 is coupled to microprocessor 26 and operates to transmit to transceiver 44 each $H_{1N}$ associated with a particular azimuth angle $A_{R1N}$. Transceiver 44 is connected to microprocessor 42 and operates to transmit each $H_{2N}$ from microprocessor 42 to transceiver 28 and, thereby, to microprocessor 26. Accordingly, both microprocessor 26 and microprocessor 42 have altitude data $H_{1N}$ and $H_{2N}$ for each azimuth line associated with an azimuth angle $A_{R1N}$ and $A_{R2N}$. Microprocessors 26 and 42 may, therefore, assign a particular altitude to each azimuth angle $A_{R1N}$ and $A_{R2N}$ and determine which such angles have substantially identical calculated $H_{1N}$ and $H_{2N}$ associated data. For each pair of such azimuth angle, the associated point of intersection which they define identifies a real target location.

Of course, it should be understood that in many instances the number of targets N will be greatly larger than 3, perhaps on the order of 50 or 100 or even more. Accordingly, the number of possible target locations $N^2$ can be increased dramatically. It is to be understood that conventional deghosting techniques may be employed to reduce somewhat this number $N^2$, while the system and methods of the subject invention may be employed to still further reduce that number of possible target locations to the actual N locations where targets in fact exist. It should also be understood that separate microprocessors 26 and 42 need not be associated with airborne antenna systems 10 and 12, respectively. Instead, the necessary data may be transmitted to a common microprocessor which is located either in association with antenna system 10 or antenna system 12 or which may be positioned at some remote airborne or ground location.

What is required is that there be some mechanism for calculating the elevation of a target associated with each azimuth angle for each of at least two antenna systems, with that elevation being calculated in response to the angle $\theta$ between two intersecting planes associated with that antenna system, the rate of sweep $\tau$ of those planes, the time delay $T_1$ between receipt in those planes of signals from the targets first in one of the planes and then in the other plane as those signals are received directly by the antenna system, the time delay $T_2$ between receipt by each antenna system of signals in the first and then in the second plane of each system signal which are emitted from the N targets and received by the antenna systems only after reflection from a remote surface, and the height or altitude of each of the antenna systems.

The relationships of equations (1) through (8) set forth above may then be utilized to determine an associated elevation for each azimuth angle of each antenna system, with the actual target locations being determined by the intersection of lines defined by those azimuth angles for associated elevations which are equal.

Since the key measurement in this type of system is time and since time can be measured with extreme accuracy, the resultant depression (elevation) angles can be computed with an accuracy far beyond that by which angles can be measured directly with antennas suitable for carrying in an aircraft. Once the depression angles are resolved, altitude can be determined and altitude can be employed as the key deghosting discriminate as set forth above.

Figure 5:
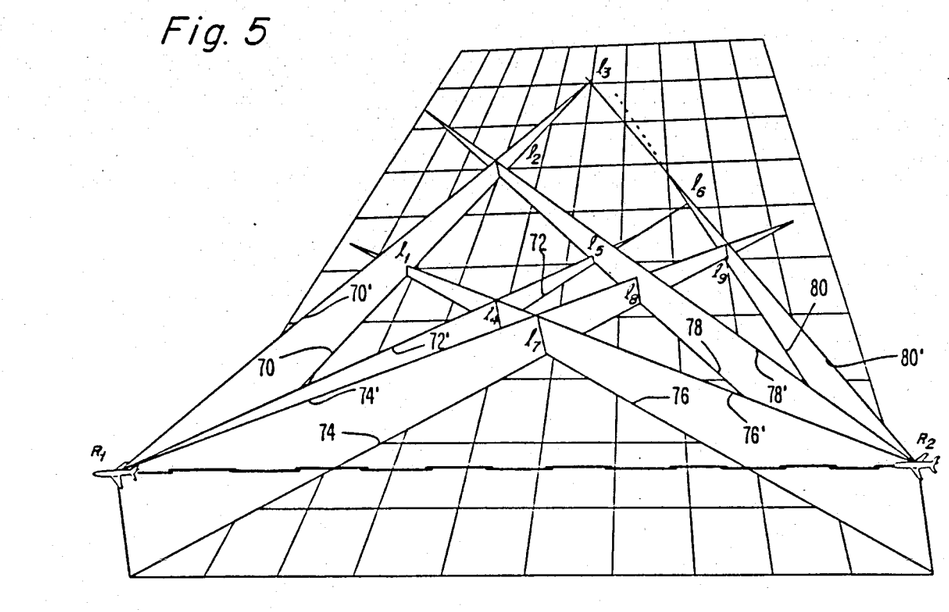
FIG. 5 is a perspective view of a vector diagram which illustrates the teachings of the present invention.

FIG. 5 is a perspective view of the intersection points $1_1$ through $1_9$. Each azimuth line 70–78 is shown having a corresponding altitude line 70'–78' which is slanted at the corresponding target depression angle $\alpha_D$, FIG. 5 shows that there is only one unique solution for each actual target, even if several targets are at the same altitude.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of general inventive concept disclosed and claim herein.

I claim:

1. A system for detecting the location of a plurality of targets comprising:
   (a) a first antenna system having first and second planes of receipt which are inclined a fixed angle ($\theta_1$) from one another, said first antenna system being located along the line of intersection of said first and second planes, said first antenna system including means for sweeping said line of intersection at a known rate of sweep ($\tau_1$), and means for measuring the instantaneous azimuth angle ($A_{R1}$) of said line of intersection;
   (b) a second antenna system spaced apart from said first antenna system a known distance (S), said second antenna system having third and fourth planes of receipt which are inclined a fixed angle ($\theta_2$) from one another, said second antenna system being located along the line of intersection of said third and fourth planes, said second antenna system including means for sweeping said line of intersection at a known rate of sweep ($\tau_2$), and means for measuring the instantaneous azimuth angle ($A_{R2}$) of said line of intersection;
   (c) means for determining the azimuth angles $A_{R1N}$ and $A_{R2N}$ for each of N targets which are within the range of said first and second antenna systems;
   (d) means for measuring the delay $T_{1R1N}$ between receipt by said first antenna system of signals in said first and then in said second planes which are emitted from each of said N targets and received directly by said first antenna system;
   (e) means for measuring the delay $T_{1R2N}$ between receipt by said second antenna system of signals in said third and then in said fourth planes which are emitted from each of said N targets and received directly by said second antenna system;
   (f) means for measuring the delay $T_{2R1N}$ between receipt by said first antenna system of signals in said first and then in said second planes which are emitted from said N targets and received by said first antenna system after being reflected from a remote surface;
   (g) means for measuring the delay $T_{2R2N}$ between receipt by said second antenna system of signals in said third and then in said fourth planes which are emitted from said N targets and received by said second antenna system after being reflected from a remote surface;
   (h) means for measuring the heights $R_{1H}$ and $R_{2H}$ of said first and second antenna systems; and
   (i) for calculating, for each of N azimuth angle $A_{R1N}$, the elevation ($H_{1N}$) of the target associated with that angle in response to $\theta_1$, $\tau_1$, $T_{1R1N}$, $T_{2R1N}$, and $R_{1H}$; means for calculating, for each of N azimuth angle $A_{R2N}$, the elevation ($H_{2N}$) of the target associated with that angle in response to $\theta_2$, $\tau_2$, $T_{1R2N}$, $T_{2R2N}$, and $R_{2H}$; and means for selecting N of the $N^2$ possible locations of said targets as real target locations by determining the location of the intersection of lines defined by said azimuth angles $A_{R1N}$ and $A_{R2N}$ for which the associated elevations $H_{1N}$ and $H_{2N}$ are equal.

2. The system of claim 1 wherein said means for calculating determines each target elevation $H_{1N}$ using the relationship:

$$H_{1N} = R_{1H} - R_{SR1N} \cdot \sin(\alpha_{DR1N})$$

$$\text{where: } R_{SR1N} = \frac{2R_{1H} \cdot \cos(\alpha_{GR1N})}{\sin(\alpha_{DR1N} + \alpha_{GR1N})};$$

$$\alpha_{DR1N} = \tan^{-1}[\sin(T_{1R1N} \cdot \tau_1)/\tan(\theta_1)]; \text{ and}$$

$$\alpha_{GR1N} = \tan^{-1}[\sin(T_{2R1N} \cdot \tau_1)/\tan(\theta_1)].$$

3. The system of either claim 1 or claim 2 wherein said means for calculating determines each target elevation $H_{2N}$ using the relationship:

$$H_{2N} = R_{2H} - R_{SR2N} \cdot \sin(\alpha_{DR2N})$$

$$\text{where: } R_{SR2N} = \frac{2R_{2H} \cdot \cos(\alpha_{GR2N})}{\sin(\alpha_{DR2N} + \alpha_{GR2N})};$$

$$\alpha_{DR2N} = \tan^{-1}[\sin(T_{1R2N} \cdot \tau_2)/\tan(\theta_2)]; \text{ and}$$

$$\alpha_{GR2N} = \tan^{-1}[\sin(T_{2R2N} \cdot \tau_2)/\tan(\theta_2)].$$

4. The system of claim 3 wherein said line of intersection of said first antenna system is parallel to a line which is tangent to the surface of the earth at a point directly below said first antenna system.

5. The system of claim 3 wherein said line of intersection of said second antenna system is parallel to a line which is tangent to the surface of the earth at a point directly below said second antenna system.

6. The system of claim 3 wherein said line of intersection of said first antenna system intersects the horizon as seen from said first antenna system.

7. The system of claim 3 wherein said line of intersection of said second antenna system intersects the horizon as seen from said second antenna system.

8. The system of claim 3 wherein said first antenna system and said means for calculating said elevations $H_{1N}$ are located on a first airplane, said second antenna system and said means for calculating said elevations $H_{2N}$ are located on a second airplane, and said means for selecting includes means for transmitting said elevation $H_{1N}$ to said second airplane and for transmitting said elevations $H_{2N}$ to said first airplane.

9. A method for detecting the location of a plurality of targets which employs a first antenna system having first and second planes of receipt which are inclined a fixed angle ($\theta_1$) from one another, said first antenna system being located along the line of intersection of said first and second planes, said first antenna system including means for sweeping said line of intersection at a known rate of sweep ($T_1$), and means for measuring the instantaneous azimuth angle ($A_{R1}$) of said line of intersection; and a second antenna system spaced apart from said first antenna system a known distance (S), said second antenna system having third and fourth planes of receipt which are inclined a fixed angle ($\theta_2$) from one another, said second antenna system being located along the line of intersection of said third and fourth planes, said second antenna system including means for sweeping said line of intersection at a known rate of sweep $\tau_2$), and means for measuring the instantaneous azimuth angle ($A_{R2}$) of said line of intersection, said method comprising the steps of:

(a) determining the azimuth angles $A_{R1N}$ and $A_{R2N}$ for each of N targets which are within the range of said first and second antenna systems;

(b) measuring the delay $T_{1R1N}$ between receipt by said first antenna system of signals in said first and then in said second planes which are emitted from each of said N targets and received directly by said first antenna system;

(c) measuring the delay $T_{1R2N}$ between receipt by said second antenna system of signals in said third and then in said fourth planes which are emitted from each of said N targets and received directly by said second antenna system;

(d) measuring the delay $T_{2RiN}$ between receipt by said first antenna system of signals in said first and then in said second planes which are emitted from said N targets and received by said first antenna system after being reflected from a remote surface;

(e) measuring the delay $T_{2R2N}$ between receipt by said second antenna system of signals in said third and then in said fourth planes which are emitted from said N targets and received by said second antenna system after being reflected from a remote surface;

(f) measuring the heights $R_{1H}$ and $R_{2H}$ of said first and second antenna systems; and (g) calculating, for each of N azimuth angles $A_{R1N}$, the elevation ($H_{1N}$) of the target associated with that angle in response to $\theta_1$, $\tau_1$, $T_{1R1N}$, $T_{2R1N}$, and $R_{1H}$; calculating, for each of N azimuth angles $A_{R2N}$, the elevation ($H_{2N}$) of the target associated with that angle in response to $\theta_2$, $\tau_2$, $T_{1R2N}$, $T_{2R2N}$, and $R_{2H}$; and selecting N of the $N^2$ possible locations of said targets as real target locations by determining the location of the intersection of lines defined by said azimuth angles $A_{R1N}$ and $A_{R2N}$ for which the associated elevation $H_{1N}$ and $H_{2H}$ are equal.

10. The method of claim 9 wherein said step of calculating relationship includes determining each target elevation $H_{1N}$ using the $$H_{1N} = R_{1H} - R_{SR1N} \cdot \sin(\alpha_{DR1N})$$

$$\text{where: } R_{SR1N} = \frac{2R_{1H} \cdot \cos(\alpha_{GR1N})}{\sin(\alpha_{DR1N} + \alpha_{GR1N})};$$

$$\alpha_{DR1N} = \tan^{-1}[\sin(T_{1R1N} \cdot \tau_1)/\tan(\theta_1)]; \text{ and}$$

$$\alpha_{GR1N} = \tan^{-1}[\sin(T_{2R1N} \cdot \tau_1)/\tan(\theta_1)].$$

11. The method of either claim 9 or 10 wherein said step of calculating includes determining each target elevation $H_{2N}$ using the relationship:

$$H_{2N} = R_{2H} - R_{SR2N} \cdot \sin(\alpha_{DR2N})$$

$$\text{where: } R_{SR2N} = \frac{2R_{2H} \cdot \cos(\alpha_{GR2N})}{\sin(\alpha_{DR2N} + \alpha_{GR2N})};$$

$$\alpha_{DR2N} = \tan^{-1}[\sin(T_{1R2N} \cdot \tau_2)/\tan(\theta_2)]; \text{ and}$$

$$\alpha_{GR2N} = \tan^{-1}[\sin(T_{2R2N} \cdot \tau_2)/\tan(\theta_2)].$$

12. The method of claim 11 wherein said line of intersection of said first antenna system is aligned parallel to a line which is tangent to the surface of the earth at a point directly below said first antenna system.

13. The method of claim 11 wherein said line of intersection of said second antenna system is aligned parallel to a line which is tangent to the surface of the earth at a point directly below said second antenna system.

14. The method of claim 11 wherein said line of intersection of said first antenna system is aligned to intersect the horizon as seen from said first antenna system.

15. The method of claim 11 wherein said line of intersection of said second antenna system is aligned to intersect the horizon as seen from said second antenna system.

16. The method of claim 11 wherein said step of calculating said elevations $H_{1N}$ is performed on a first airplane which also carries said first antenna system; said step of calculating said elevations $H_{2N}$ is performed on a second airplane which also carries said second antenna system, and said step of selecting includes transmitting said elevations $H_{1N}$ to said second airplane and transmitting said elevations $H_{2N}$ to said first airplane.

* * * * *